United States Patent [19]

Riedinger

[11] 4,153,556

[45] May 8, 1979

[54] METHOD AND APPARATUS FOR CONDITIONING DEMINERALIZED WATER

[75] Inventor: Alan B. Riedinger, La Jolla, Calif.

[73] Assignee: UOP Inc., Des Paines, Ill.

[21] Appl. No.: 865,144

[22] Filed: Dec. 28, 1977

[51] Int. Cl.² .................................... B01D 19/04
[52] U.S. Cl. .................... 210/218; 210/48; 210/288; 55/41; 55/46; 55/194
[58] Field of Search ............ 210/46, 45, 48, 51, 210/56, 49, 59, 288, 218, 50, 188; 55/36, 41, 190, 194, 46; 423/430

[56] References Cited

U.S. PATENT DOCUMENTS

| 584,628 | 6/1897 | Dervaux | 210/56 |
| 1,714,828 | 5/1929 | Travers | 210/50 |

FOREIGN PATENT DOCUMENTS

| 1132505 | 6/1962 | Fed. Rep. of Germany | 210/59 |
| 1198748 | 3/1964 | Fed. Rep. of Germany | 210/59 |
| 997445 | 9/1951 | France | 210/46 |

OTHER PUBLICATIONS

Betz Handbook of Industrial Water Conditioning, 5th Ed., pp. 36-37, (1958).

Primary Examiner—Benoît Castel
Attorney, Agent, or Firm—James R. Hoatson, Jr.; Barry L. Clark; William H. Page II

[57] ABSTRACT

The invention relates to a simple, very economical apparatus for conditioning "aggressive" demineralized brackish water or sea water to remove $CO_2$ and raise the pH to about 8. The invention is undemanding as to operator skill and attention and can be used economically with rather small quantities of water, such as a few thousand gallons a day. It requires no instruments or controls and utilizes inexpensive, generally available materials, principally limestone chips. The water is first sprayed at low pressure against a conical surface to cause it to film and release the bulk of the free $CO_2$. The water is then fed upwardly through a bed of limestone chips with at least a two minute reaction time to convert the balance of the $CO_2$ to calcium bicarbonate which is soluble and produces a pH of about 8.

1 Claim, 2 Drawing Figures

METHOD AND APPARATUS FOR CONDITIONING DEMINERALIZED WATER

BACKGROUND OF THE INVENTION

When brackish water or sea water is demineralized, by methods which include reverse osmosis, distillation, ion exchange and electrodialysis, the feed stream generally requires pH adjustment. The waters almost always contain appreciable quantities of calcium, magnesium and bicarbonate ions, otherwise described as hardness and alkalinity. The pH of the feed streams as received is generally close to 8, which means that it contains little $CO_2$ and is essentially saturated with calcium carbonate. This in turn means that any attempt to extract purified water will result in concentrating the remaining feed fluid, causing the calcium carbonate concentration to exceed saturation, which rapidly causes scaling of the equipment surfaces with adverse consequences.

Therefore it is customary to reduce the pH to approximately 6 or less by the addition of mineral acid, such as $H_2SO_4$ or HCl. This produces free $CO_2$ and insures that there is no carbonate ion in the feed. $CO_2$ will then appear in the purified water in all devices. The purified water will, in any event, contain relatively low concentrations of calcium or bicarbonate. Thus it is characterized as an "aggressive" water or one which is quite corrosive to community and domestic piping systems and components. The pH of such a water will probably be in the range of 5-6. These waters are typically very low in hardness.

For storage and distribution the water must be conditioned or "stabilized" by reducing the $CO_2$ and additionally raising the pH to approximately 8.

Conventionally this is accomplished by a forced draft decarbonator followed by lime injection on a controlled basis to raise the pH to 8. This involves an electric motor, float controls, lime slurry preparation, controlled feeding and pH regulation, for example. The cost, even for small systems, of such relatively sophisticated devices can be quite considerable. Such systems also impose a burden of operator attention and sophistication. There is a need, generally in remote and/or undeveloped areas, for compact systems, which are relatively simple and undemanding as to operator skill and attention, with the capability to utilize demineralization to convert sea water and brackish water to purified water at the rate of a few thousands of gallons per day.

SUMMARY OF THE INVENTION

It is among the objects of the present invention to provide a novel apparatus for accomplishing degasification to remove $CO_2$ and raise the pH of demineralized water in a very simple and completely assured fashion, without instruments and controls, while utilizing very inexpensive materials which are available and can readily be assembled under the most remote and primitive conditions.

The concept is applicable to the product water from all demineralization devices where pH adjustment has been utilized to prevent calcium carbonate scaling. In the apparatus of my invention, the purified water is fed through a wide-angle low pressure spray nozzle onto a conical surface where it films out at a relatively slow rate releasing the bulk of the free $CO_2$. The stream then travels down a center tube and up through a bed. The material in the bed is preferably limestone chips which are available at trivial cost just about everywhere. The bed diameter and height are so chosen that the water residence time is at least two minutes, to insure reaction. This will convert the remaining $CO_2$ to bicarbonate while dissolving an additional amount (a few ppm of calcium carbonate) and converting it to bicarbonate. Properly sized, the pH cannot go above 8 and there will be little if any free $CO_2$. Thus the water will now be appropriately non-aggressive. Limestone will be consumed at a slow rate and can be replaced from time to time with little effort.

With feed waters containing significant concentrations of alkalinity the water produced by demineralization (distillation or reverse osmosis), even though the pH is not adjusted with acid, will have a higher ratio of $CO_2$ to $HCO_3$, thus a lower pH and still require conditioning, preferably to saturation with respect to $CaCO_3$.

A significant advantage of this invention is that it dispenses with blowers, feeders and controllers while assuring consistant properties of the conditioned product at a cost which is only about 2% of the commercial equipment ordinarily used. It can be assembled rapidly with commonly available plastic pipe and an inexpensive spray nozzle. The permeate pressure requirement, in a reverse osmosis system, is readily available with no effect on reverse osmosis (less than 10 psi) system performance, and no additional pump is required up to the final conditioned water storage tanks.

DESCRIPTION OF THE PREFERRED EMBODIMENT

Figure 1:
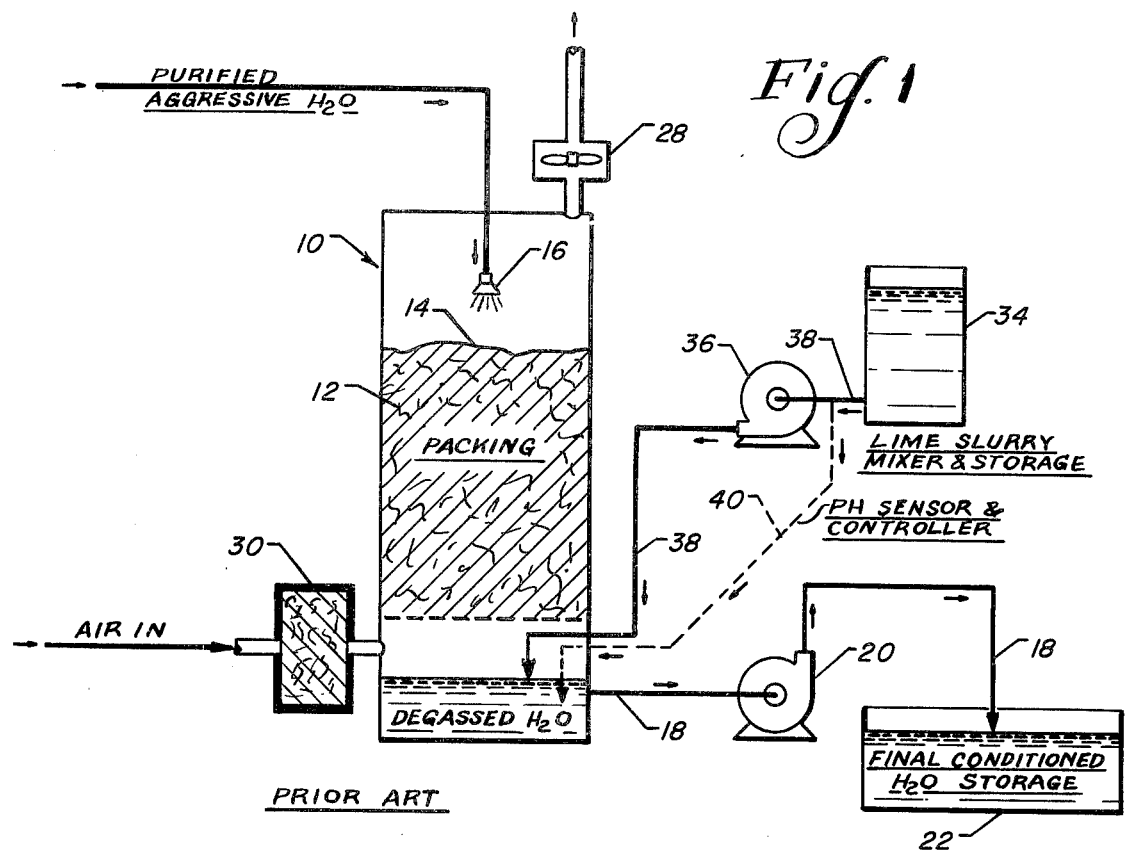
FIG. 1 is a schematic representation of a prior art system for conditioning previously demineralized water in order to reduce the $CO_2$ contained in it and to raise its pH.

Referring to FIG. 1, a representative prior art conditioning system is indicated schematically at 10. The prior art system is shown as comprising a treatment vessel 12 having a packing bed 14 therein. The packing bed may contain any suitable material for achieving gas-liquid contact such as berl saddles, or rings, for example. Purified aggressive water which has been demineralized by reverse osmosis or another process is sprayed onto the packing by a spray nozzle 16 and filters down through the packing to the bottom of the vessel 12 from which it may be moved by a transfer line 18 and pump 20 to a final conditioned water storage tank 22. As the water passes downwardly through the packing bed 14 it is contacted by an upward flow of air generated by the blower member 28 which exhausts air which has entered the vessel below the bed 14 through an air filter 30. The forced draft induced by the blower 28 functions to decarbonate the water passing down through the bed 14. As the water reaches the bottom of the vessel 12 it has most of the $CO_2$ removed but still has a pH less than the desired value of approximately 8. The pH value is increased by injecting lime on a controlled basis. Such a system is shown as including a lime slurry mixer and storage tank 34, a pump 36, an inlet line 38, and a pH sensor and controller system 40 for regulating the flow of lime into the vessel 12. As previously mentioned, such a system is quite complicated and expensive and requires trained personnel to operate it.

Figure 2:
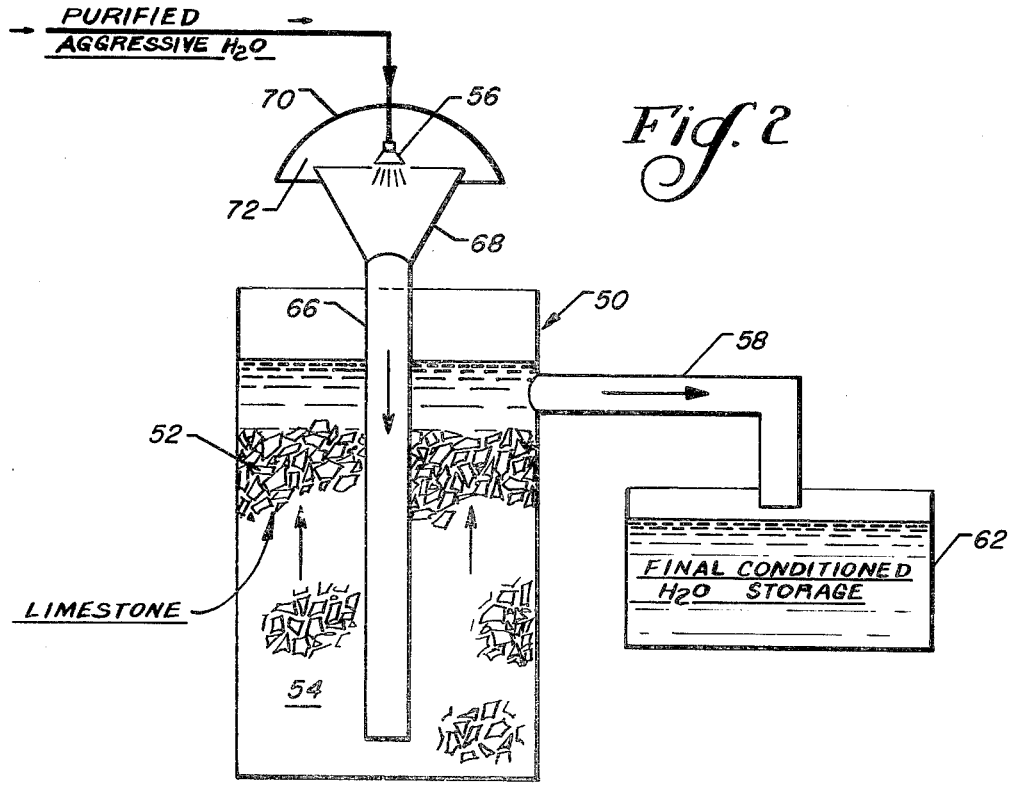
FIG. 2 is a schematic representation of my improved apparatus for accomplishing the same end result as the far more complicated and expensive apparatus of FIG. 1.

FIG. 2 illustrates an exceedingly simple conditioning system indicated schematically at 50 which includes a vessel 52 which may be made of concrete or other suitable material. The vessel 52 is filled with a bed of limestone chips 54 which are widely available throughout the world at very little cost. A wide angle, low pressure (approximately 10–20 psi) spray nozzle 56 is used to supply purified aggressive water to the system 50 in such a manner that it can percolate up through the limestone bed 54 and pass out through outlet pipe 58 to a final conditioned water storage tank 62. The dimensions of the vessel 52 and the depth of the bed 54 are determined in accordance with the volume of water to be treated so that the water will maintain a residence time in contact with the limestone bed 54 of at least about 2 minutes. This is sufficient time to permit the pH to increase to about 8 and to remove all of the $CO_2$ in the water. In order to reach the bottom of the bed 54, the water leaving the nozzle 56 travels down a pipe 66 which may be made of plastic or other suitable material and having an inlet cone portion 68 which permits the water impinging upon it from the nozzle 56 to form a film which facilitates the release of the bulk of the $CO_2$ contained in the water. The inlet cone 68 is preferably covered with a cover 70 which is spaced from the cone portion by an opening 72 so that the released $CO_2$ may escape.

The simplicity of the disclosed system and its extremely low cost renders it quite suitable for use in remote and/or undeveloped areas where water is being treated in relatively small quantities.

I claim as my invention:

1. Apparatus for conditioning demineralized water by removing $CO_2$ and raising the pH comprising a vessel containing a bed of limestone chips, an open-ended water inlet tube extending downwardly from a point above the vessel into the bed of limestone chips and terminating in the lower portion of said bed and vessel for introducing the water to the bottom of the bed to pass upwardly through the bed, an outlet at the upper portion of the vessel for removing the water which has passed upwardly through said bed, an upwardly diverging entrance cone at the upper end of said inlet tube, and a wide-angle low pressure spray nozzle fluidly connected to an aggressive water supply through a conduit and positioned to discharge said aggressive water from said supply into the entrance cone, said entrance cone being open to the atmosphere and positioned relative to said spray nozzle so as to permit the water sprayed from the nozzle to film out relatively slowly on the surface of the entrance cone, thereby releasing the bulk of the free $CO_2$ contained therein, said bed of limestone chips being of a sufficient diameter and depth to insure a water residence time in contact with the chips of at least about two minutes.

* * * * *